(12) United States Patent
Vesely (10) Patent No.: US 8,259,437 B2
(45) Date of Patent: Sep. 4, 2012

(54) ADJUSTABLE DISPLAY SCREEN FOR A PORTABLE COMPUTING DEVICE

(75) Inventor: Ivan Vesely, Larkspur, CO (US)

(73) Assignee: Empire Technology Development LLC, Wilmington, DE (US)

( * ) Notice: Subject to any disclaimer, the term of this patent is extended or adjusted under 35 U.S.C. 154(b) by 255 days.

(21) Appl. No.: 12/719,651

(22) Filed: Mar. 8, 2010

(65) Prior Publication Data

US 2011/0216483 A1    Sep. 8, 2011

(51) Int. Cl.
*H05K 5/00* (2006.01)
*H05K 7/00* (2006.01)
*G09G 5/00* (2006.01)

(52) U.S. Cl. ......... 361/679.01; 361/679.02; 361/679.04; 361/679.06; 361/679.07; 361/679.21; 361/679.26; 361/679.27; 361/679.28; 361/679.29; 361/679.3; 361/379.55; 361/679.57; 361/679.58; 345/168; 345/184; 345/156

(58) Field of Classification Search ............. 361/679.01, 361/679.02, 679.08, 679.09, 679.3, 679.55–679.59; 345/156, 157, 168, 169, 184; 312/223.1; 455/575.3, 550.1, 56
See application file for complete search history.

(56) References Cited

U.S. PATENT DOCUMENTS

| | | | |
|---|---|---|---|
| 6,006,243 A | 12/1999 | Karidis | |
| 6,158,359 A * | 12/2000 | Allan et al. | ..... 108/93 |
| 7,342,777 B2 | 3/2008 | Chen | |
| 2004/0228077 A1 * | 11/2004 | Hall et al. | ..... 361/681 |
| 2007/0058329 A1 | 3/2007 | Ledbetter et al. | |
| 2007/0206349 A1 | 9/2007 | Jacobs | |
| 2008/0076347 A1 * | 3/2008 | Chang | ..... 455/3.05 |
| 2009/0174658 A1 | 7/2009 | Blatchley et al. | |
| 2010/0046149 A1 * | 2/2010 | Wang et al. | ..... 361/679.01 |
| 2010/0053878 A1 | 3/2010 | Smejkalova | |
| 2010/0087232 A1 * | 4/2010 | Yeh et al. | ..... 455/575.4 |

OTHER PUBLICATIONS

PCT International Searching Authority, International Search Report and Written Opinion in PCT Application No. PCT/US11/27384, Sep. 29, 2011, ISA/US, Alexandria VA.
Kwan, Video: Adjustable Ergonomic Laptop is a DreamCom True, Mobile Magazine, Mar. 4, 2008, 8 pages.
Sooman, Samsung unveils notebook with detachable screen; TechSpot.com, Sep. 7, 2005, 4 pages.
The Travel Insider; Aviator Laptop Computer Stand, 5 pages.
Wilson, GeCube Genie PC, Eee Clone with a Special Talent, Gizmodo, 1 page.
IBM; Detachable Screen for Laptop computer; IP.com No. IPCOM000030475D; Aug. 17, 2004, 2 pages.

* cited by examiner

*Primary Examiner* — Jayprakash N Gandhi
*Assistant Examiner* — Jerry Wu
(74) *Attorney, Agent, or Firm* — Jensen & Puntigam, PS

(57) ABSTRACT

Technologies are generally described for an adjustable display screen such as for a notebook computer or other portable device. In some examples, at least one display screen rail may be rotatably coupled to a back edge of a notebook computer base unit at a hinge rod. The display screen of the notebook computer may slide along and/or pivot on the at least one display screen rail in a direction to bring the display screen toward a user of the notebook computer while leaving room for the user to access a keyboard located on a top surface of the base unit. Mechanisms may be coupled to the notebook computer to transmit motion of the display screen along a first display screen rail to motion of the display screen along a second display screen rail, thereby mitigating binding of the display screen as it slides along the display screen rails.

17 Claims, 9 Drawing Sheets

ADJUSTABLE DISPLAY SCREEN FOR A PORTABLE COMPUTING DEVICE

BACKGROUND

Unless otherwise indicated herein, the materials described in this section are not prior art to the claims in this application and are not admitted to be prior art by inclusion in this section.

Figure 1A:
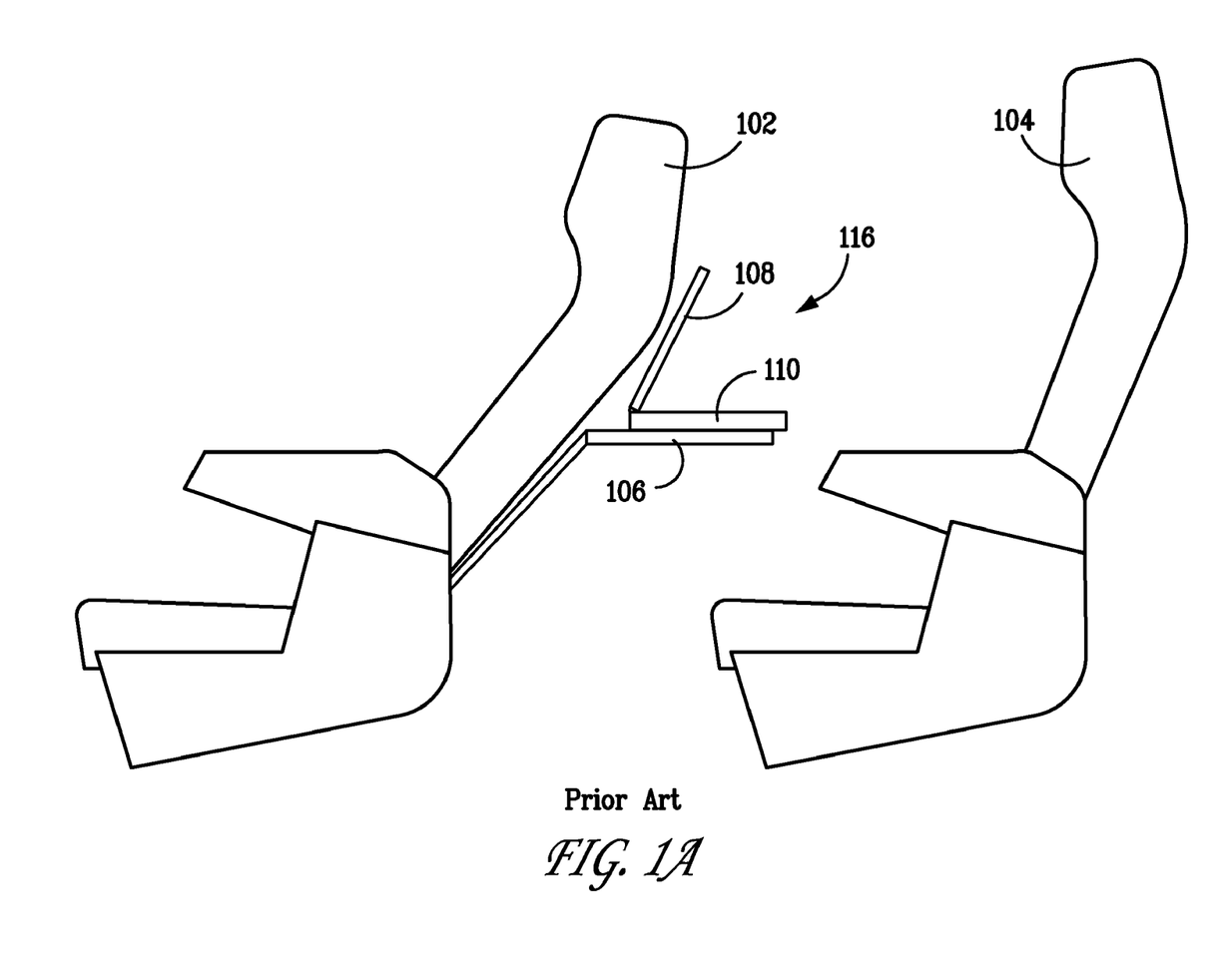
FIG. 1A is a side view of an example prior art notebook computer sitting on a fold-down seatback tray table behind an example of a reclined commercial airline seat.

As notebook computers are becoming more portable, durable and ubiquitous, they are increasingly being used in a variety of locations including cramped areas while traveling in automobiles, buses, planes and trains. In order to adjust the display screen of the notebook computer to fit into a more compact area (such as when the seatback in front of the user is reclined), a user may be required to fold down the display screen of the notebook computer to such an angle that makes viewing the screen difficult or impossible. For example, FIG. 1A is a side view of an example prior art notebook computer 116 sitting on a fold-down seatback tray table 106 behind an example of a reclined commercial airline seat 102. Note that the display screen is prevented from completely opening by the reclined seat 102. As a result, the angle between the base unit 110 and the display screen 108 is such that it makes viewing of the display screen difficult by a user sitting in the seat behind the reclined seat 102. Thus, an adjustable display screen is needed for portable computing devices that allows for easier viewing of the display screen in tighter areas.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

wherein FIGS. 1B through 11 are all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, and devices related to an adjustable display screen for a portable computer such as a notebook or laptop computer.

Figure 1B:
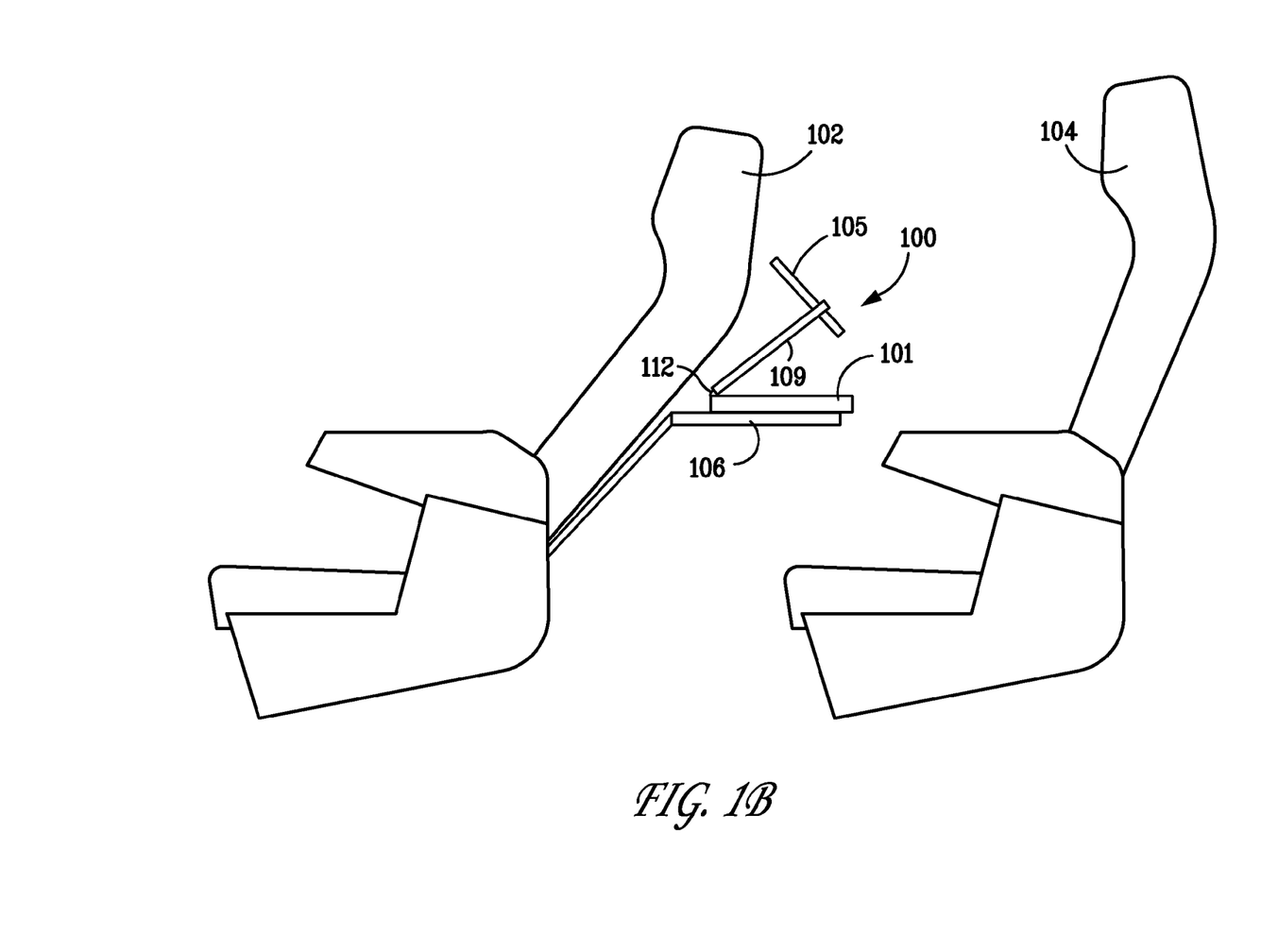
FIG. 1B is a side view of an example notebook computer, in accordance with at least some embodiments described herein, sitting on a fold-down seatback tray table behind an example of a reclined commercial airline seat.

Briefly stated, one or more display screen rails may be rotatably attached to a back edge of a notebook computer base unit. The display screen of the notebook computer may slide along and pivot on the display screen rail (or rails) in a direction to bring the display screen toward a user of the notebook computer while leaving room for the user to access a keyboard located on a top surface of the base unit. For example, shown in FIG. 1B is a side view of an example notebook computer 100, in accordance with at least some embodiments described herein, sitting on a fold-down seatback tray table 106 behind an example of a reclined commercial airline seat 102. The notebook computer 100 has at least one display screen rail 109 rotatably attached to a back edge of a notebook computer base unit 101 at a hinge 112. Note that the display screen 105 has been slid to a forward position along a display screen rail 109 away from the back of the reclined seat 102. The display screen 105 has also been pivoted up to improve the viewing angle while still providing enough room above the base unit 101 for a user to access an input device such as a keyboard or touchpad on the base unit 101.

In a two rail implementation, the notebook computer 100 may have mechanisms such as a coupler to transmit motion of the display screen 105 along the first display screen rail 109 to motion of the display screen 105 along the second display screen rail 107 (see FIG. 1C), thereby helping to prevent binding of the display screen as it slides along the display screen rails.

Figure 1C:
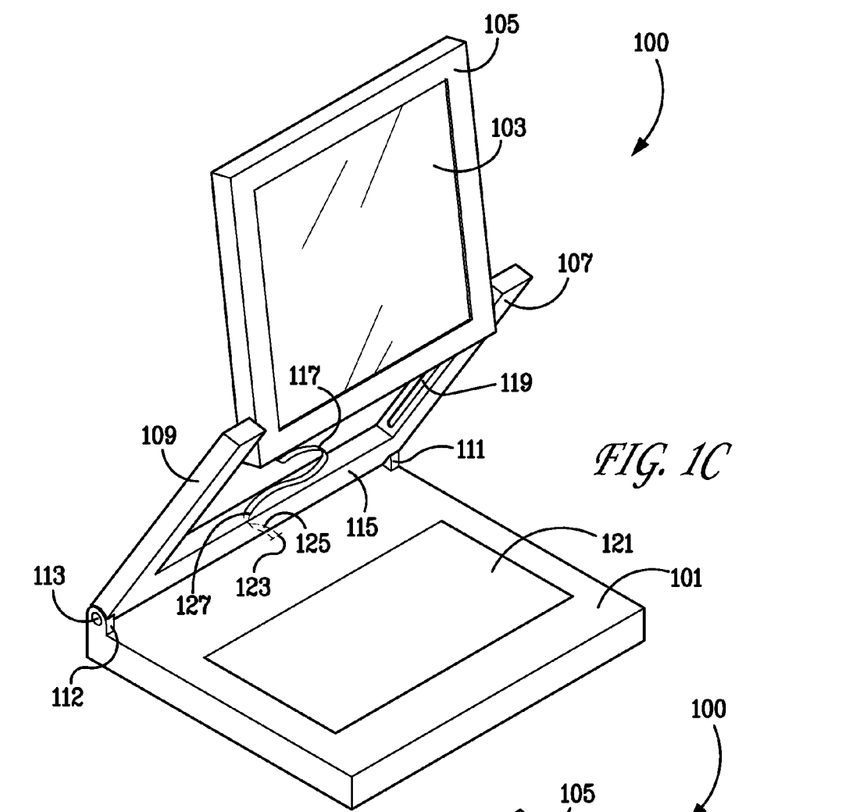
FIG. 1C is a front perspective view of the notebook computer of FIG. 1B with an adjustable display screen open and slid upward on two rails and pivoted to face a user.

Referring next to FIG. 1C, shown is a front perspective view of a portable computing device (e.g., a notebook computer 100) with an adjustable display screen 105 open and slid upward on two rails 107 109 and pivoted to face a user according to at least some embodiments described herein. Depicted in FIG. 1C is the example notebook computer 100 with a notebook computer base unit 101, a display screen 103, a display screen housing 105, display screen rails 107 and 109, fixed hinges 111 and 112, a hinge rod 113, a hinge rod housing 115, a computer display screen cable 117, and keyboard area 121. The fixed hinges 111 and 112 may be coupled to, or in some examples formed integral with, one end the notebook computer base unit 101 that has a keyboard area 121 near the opposite end. The fixed hinges 111 and 112 have a hinge rod 113 that passes through the interior of the hinge rod housing 115. The hinge rod housing 115 is rotatably coupled to the hinge rod 113 at fixed hinges 111 and 112 so that it may pivot about the hinge rod 113. Coupled to, or alternatively formed integral with, the hinge rod housing 115 are the two display screen rails 107 and 109. The display screen rails 107 and 109 extend outward substantially perpendicular to the hinge rod housing 115 and may be adapted to rotate in unison about the hinge rod 113. The display screen rails 107 and 109 and/or hinge rod housing 115 may be made of a rigid material such as, for example, a polymer plastic or a metal such as aluminum for extra rigidity.

Disposed between the display screen rails 107 and 109 is the display screen housing 105 that holds the notebook computer display screen 103. The display screen housing 105 may be slidably and/or rotatably coupled to the display screen rails 107 and 109 through a slot 119 running lengthwise along the interior of each display screen rail 107 and 109. One may be able to manually open the notebook computer 100 and slide the display screen 103 along the rails 107 and 109 to adjust its height above the notebook computer base unit 101 and also manually pivot the rails 107 and 109 and the display screen 103 back and forth independently to change the distance and angle of the display screen 103 relative to a user sitting in front of the notebook computer 100. The length and position of the slot 119 may be selected such that the display screen housing 105 may slide down along the rails 107 and 109 and pivot shut with the top edge of the display screen housing 105 even with the top ends of the rails 107 and 109 (see FIG. 2).

The display screen 103 may be of any variety such as a suitably thin flat panel that may be used in a portable device such as a notebook computer display screen (for example, a liquid crystal display or LCD). The computer display screen may be operably coupled to the notebook computer base unit 101 via a display screen cable 117. The display screen cable 117, for example, may be a resilient but flexible ribbon-type cable that can be coupled to a graphics component within the notebook computer base unit 101 through an opening 123 in the base unit 101 housing. The hinge rod housing 115 may have an entrance opening 125 and an exit opening 127 through which the display screen cable 117 may travel from the notebook computer base unit 101 to the display screen 103.

Figure 1D:
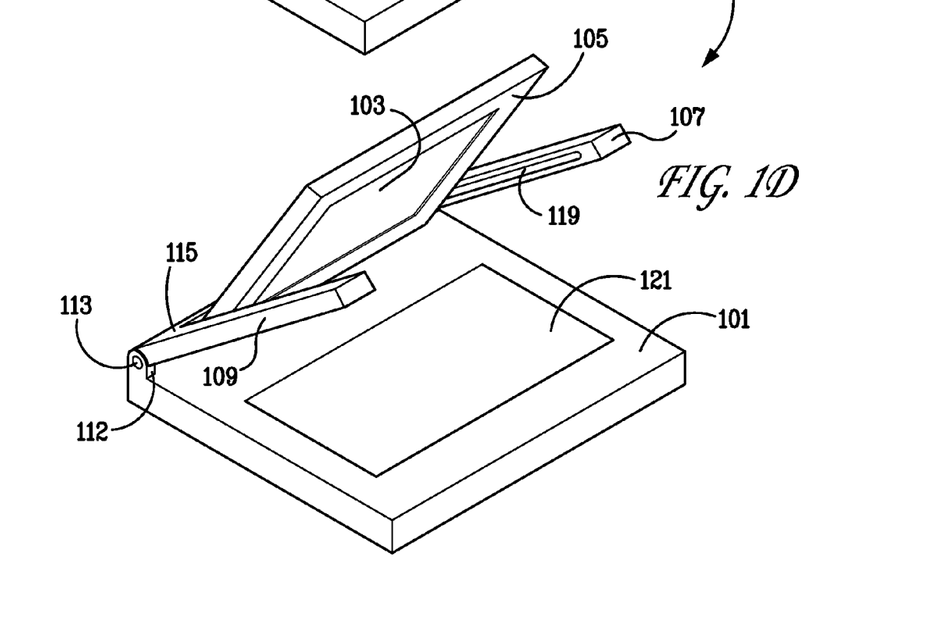
FIG. 1D is a front perspective view of the notebook computer of FIG. 1B with the adjustable display screen partially closed and slid downward on the two rails.

Referring next to FIG. 1D, shown is a front perspective view of the notebook computer 100 of FIG. 1B with the adjustable display screen 103 partially closed and slid downward on the two rails 107 and 109 according to an example embodiment. The display screen rails 107 and 109 and the display screen 103 are shown with a smaller angle relative to the notebook computer base unit 101 than that shown in FIG. 1C due to the pivoting of the display screen rails 107 and 109 about the hinge rod 113, and pivoting downward of the display screen housing 105 rotatably attached to the display screen rails 107 and 109. In some examples, the pivoting and sliding of the display screen 103 may be facilitated by a user applying pressure on the display screen housing 105 downward and toward the fixed hinges 111 and 112. The display screen 103 may also be adjusted and pivoted in an opposite direction by a user pulling on the display screen housing 105 upward and toward the user while sitting in front of the notebook computer 100. In this manner, the distance between the display screen 103 and the user may be shortened while also providing both enough room below the display screen 103 for the user to access the keyboard area 121 and a proper viewing angle of the display screen 103. An example of the display screen 105 in such a position is shown in FIGS. 1B and 1C, which may also be useful for easier viewing of the display screen in cramped areas, for example, while traveling in an automobile, airplane, bus or train when the seat back of the person in front of the user is in a reclined position.

Figure 2:
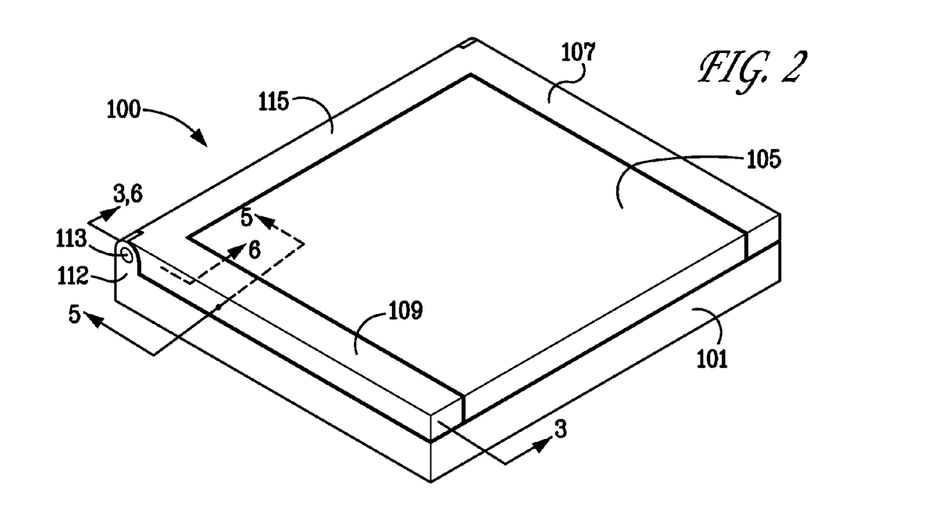
FIG. 2 is a perspective view of the notebook computer of FIG. 1B with the adjustable display screen closed.

Referring next to FIG. 2, shown is a perspective view of the notebook computer 100 of FIG. 1B with the adjustable display screen may be closed in accordance with some example embodiments. As depicted in FIG. 2, the display screen rails 107 109 are of a width and length such then when the notebook computer is closed, the front ends and sides of the display screen rails 107 109 are even with the front end and sides of the notebook computer base unit 101.

Figure 3:
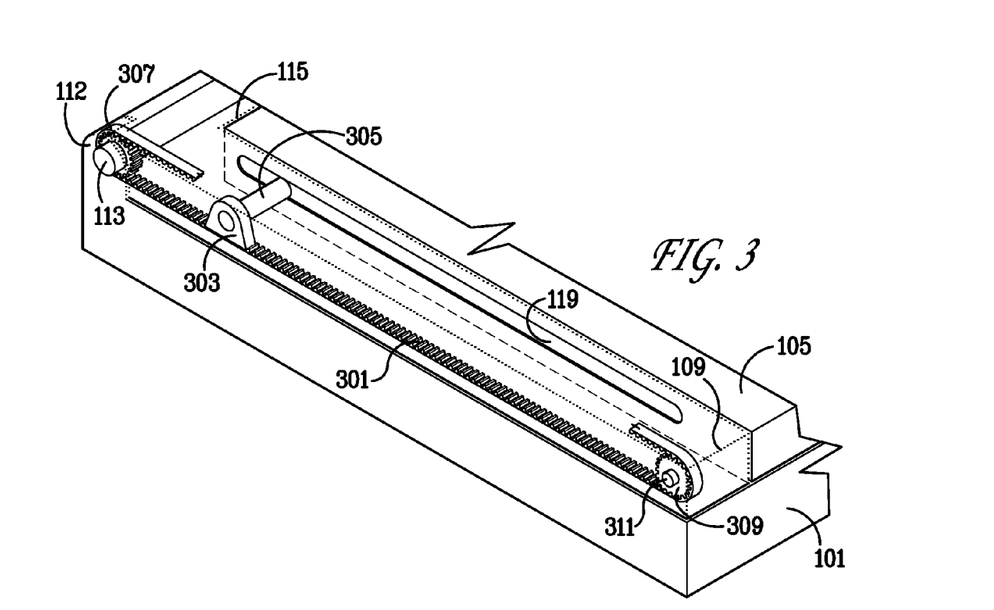
FIG. 3 is an enlarged perspective partial view of the notebook computer of FIG. 1B with the display screen closed and showing internal mechanisms of one of the rails.

Referring next to FIG. 3, shown is an enlarged perspective partial view of an example notebook computer such as computer 100 of FIG. 1B. As shown, the display screen 105 is in a closed position with a view of internal coupling mechanisms of a display screen rail 109 that is adapted in accordance with at least some example embodiments described herein. Depicted in FIG. 3 are the notebook computer base unit 101, display screen rail 109, display screen rail slot 119, fixed hinge 112, hinge rod 113, hinge rod housing 115, a toothed belt 301, a slidable hinge carriage 303, a slidable hinge pin 305, a first gear 307, a second gear 309, and a gear pin 311.

The first gear 307 is adapted to surround and may be fixedly coupled to an end of the hinge rod 113 within the fixed hinge 112 so that rotating of the first gear 307 also causes the hinge rod 113 to rotate within the hinge rod housing 115. Alternatively, the first gear 307 may be rotatably coupled to the hinge rod such that it may rotate freely about the hinge rod 307.

The second gear 309 is rotatably coupled to the gear pin 311 inside the display screen arm 109 so that it may rotate about the gear pin 311. Gear pin 311 can be fixedly coupled to an interior side wall of the display screen arm 109 near the front of the display screen arm 109 opposite to that of the hinge rod 113 and positions the second gear 309 in line with the first gear 307. The first and second gears 307 and 309 and gear pin 311 may be made of a highly rigid material such as a durable polymer plastic or aluminum for extra durability. The toothed belt 301 is adapted to mesh with both the first gear 307 and second gear 309 at opposite ends inside the display screen arm 109 and thus facilitates rotation of the gears 307 and 309 and hinge rod 307 in unison as the toothed belt 301 moves. Alternatively, instead of the second gear 309, a smooth wheel with a groove around the outside edge of the wheel may be rotatably coupled to the gear pin 311. The toothed belt 301 may then run through the groove in the wheel as it rotates. The dimensions and configuration of the hinge rod 113, first gear 307, second gear 309, toothed belt 301 and gear pin 311 are such that allow them to fit and operate smoothly within the display screen rail 109 and fixed hinge 112.

The slidable hinge carriage 303 is fixedly coupled to the interior of the toothed belt 301 and is also fixedly coupled to one end of the slidable hinge pin 305. The slidable hinge pin 305 can extend from the slidable hinge carriage 303 through the slot 119 in the interior side of display screen rail 109. The display screen housing 105 can be rotatably coupled the other end of the slidable hinge pin 305 that extends through the slot 119 in the display screen rail 109, thus coupling the slidable hinge carriage 303 to the display screen housing 105 in a manner that facilitates movement of the toothed belt when the display screen is slid along the display screen rail 109 into housing 105.

When more than one rail is utilized in a particular implementation, similar mechanisms shown in FIG. 3 within display screen rail 109 may also be present in the opposite display screen rail 107 (not shown in FIG. 3). Thus, the movement of the toothed belt 301 can effectuate rotation of the hinge rod 113 and thereby cause a toothed belt in the opposite display screen rail 107 to move in unison, also pulling the display screen housing along the opposite display screen rail 107. The substantially simultaneous movement of both internal mechanisms within the display screen rails 107 and 109 may facilitate distribution of forces in a substantially equal proportion on both sides of the display screen housing 105 as it slides along the display screen rails 107 and 109, thereby transmitting motion of the display screen housing 105 along the first display screen rail 107 to motion of the display screen housing 105 along the second display screen rail 109 (and vice versa) reducing binding of the display screen housing 105 as it slides along the display screen rails 107 and 109. The dimensions of the slidable hinge carriage 303, a slidable hinge pin 305 may be selected to allow them to fit and operate smoothly within the display screen rail 109.

For implementations that employ more than one rail, other configurations of mechanisms such as gears, pulleys, wires, tracks, wheels, driveshafts, belts, etc., that, like those described above, may be adapted to prevent binding of the sliding display screen 103 by transmitting motion of the display screen 103 along one display screen rail 107 to motion of the display screen 103 along another display screen rail 109, and vice versa, may also be utilized.

Figure 4:
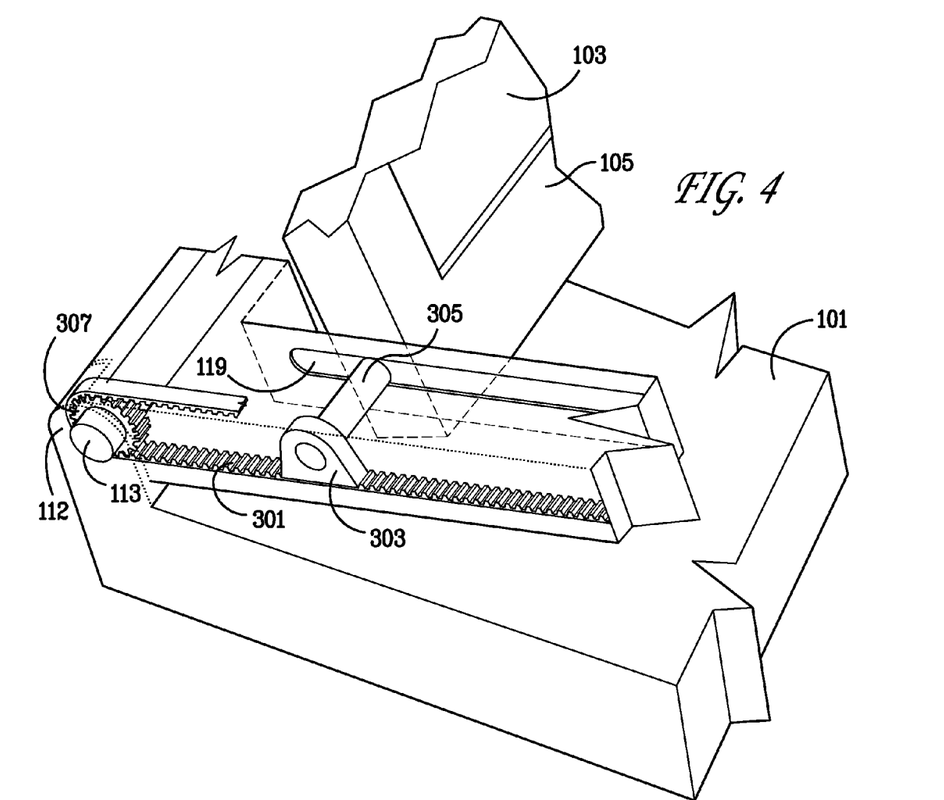
FIG. 4 is an enlarged perspective partial view of the notebook computer of FIG. 1B with the display screen open and showing internal mechanisms of one of the rails.

Referring next to FIG. 4, shown is an enlarged perspective partial view of the notebook computer 100 of FIG. 1B with the display screen 103 open and showing internal mechanisms of one of the rails 109 according to some example embodiments. FIG. 4 depicts the display screen housing 105 pivoting on the slidable hinge pin 305 while sliding along the display screen rail. Note that the display screen rail may also pivot at the hinge rod 113 as the hinge rod 113 rotates as a result of the display screen housing 105 being slid along the display screen rail.

Figure 5:
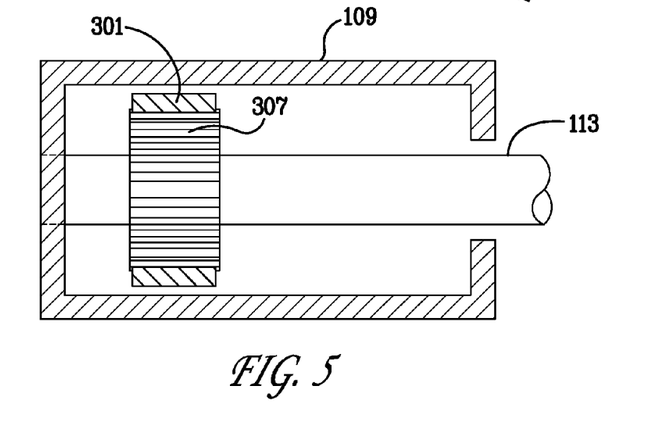
FIG. 5 is a front cross sectional view of one of the rails as depicted FIG. 2.

Referring next to FIG. 5, shown is a front cross sectional view of one of the rails as depicted in FIG. 2 according to some example embodiments. Shown is the hinge rod 113 as it passes through the hinge rod housing 115 at the back end of a display screen rail 109. Also shown is the toothed belt 301 as it meshes with the first gear 307 surrounding the hinge rod 113.

Figure 6:
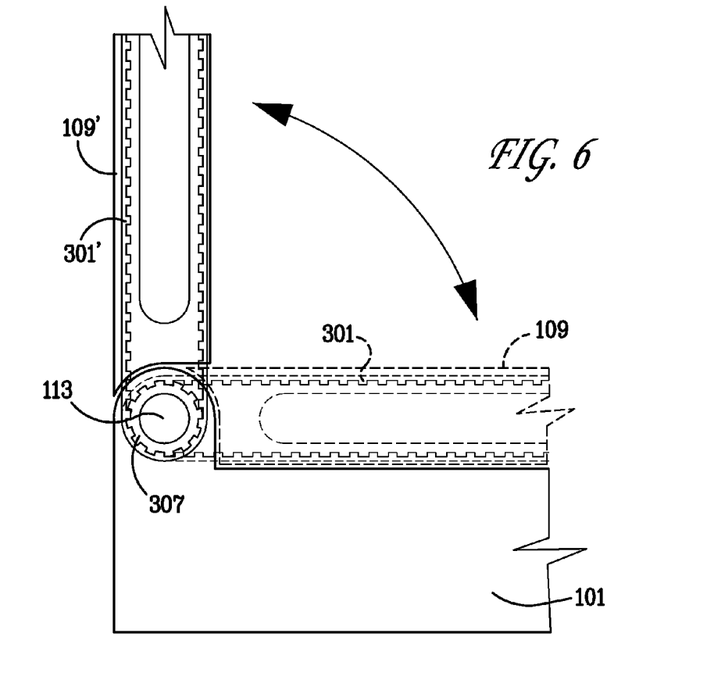
FIG. 6 is a side cross sectional view of the rear section of the notebook computer having a fixed hinge as depicted FIG. 2.

Referring next to FIG. 6, shown is a side cross sectional view of the rear section of the notebook computer 100 having a fixed hinge as depicted in FIG. 2 according to some example embodiments. Shown is one view with the display screen rail 109 and internal toothed belt 301 in a closed position and one view of the display screen rail 109' and internal toothed belt 301' in an open vertical position. This illustrates how the display screen rail 109 pivots on the hinge rod 113 while the internal mechanisms of the display screen rail 109 such as the first gear 307 and toothed belt 301 may operate independent of the pivoting of the display screen rail 109 itself.

Figure 7A:
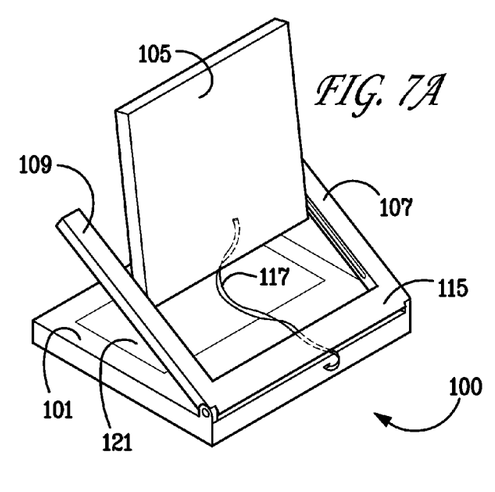
FIG. 7A is a rear perspective view of the notebook computer of FIG. 1B with the adjustable display screen open and showing a folded display screen cable configuration.

Referring next to FIG. 7A, shown is a rear perspective view of the notebook computer 100 of FIG. 1B with the adjustable display screen housing 105 slid up and showing a folded display screen cable 117 configuration according to some example embodiments. Depicted is the display screen cable 117 traveling from a back wall of the notebook computer base unit 101 through the hinge rod housing 115 to the display screen behind the display screen housing 105.

Figure 7B:
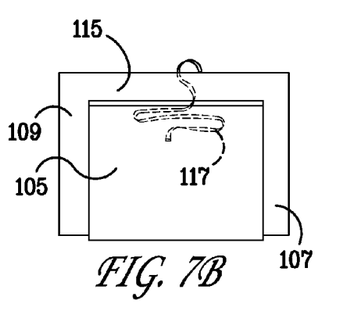
FIG. 7B is a top planar view of the notebook computer of FIG. 1B with the adjustable display screen closed and partially slid forward on the two rails showing a folded display screen cable configuration.

Referring next to FIG. 7B, shown is a top planar view of the notebook computer 100 of FIG. 1B with the adjustable display screen housing 105 folded down and partially slid forward on two rails 107 and 109 showing a folded display screen cable configuration according to some example embodiments. Depicted in FIG. 7B, is the display screen cable (e.g., including but not limited to a ribbon-type cable) folded behind the display screen housing 105. There may be a space behind the display screen within the display screen housing 105 of sufficient width such that the display screen cable 117 may be hidden in a folded manner when the display screen housing 105 is slid down along the rails 107 and 109. The flexible ribbon-type display screen cable 117 may be wide enough and resilient enough to aid in preventing twisting of the cable 117 as it runs from the side of the hinge rod housing 115 to the display screen inside the display screen housing 105. The exit opening in the hinge rod housing 115 may be a slit large enough to allow the ribbon-type display screen cable 117 to pass through it, but small enough to further aid in preventing twisting of the display screen cable 117 as it runs to the display screen within the display screen housing 105. In this way, the twisting and possible pinching of the display screen cable 117 between the bottom of the display screen housing 105 and the side of the hinge rod housing 115 when the display screen housing 105 is slid down completely along the rails 107 and 109 may be at least partially prevented.

The display screen cable 117 can also be protected within the display screen housing 105 when the display screen housing 105 is slid completely down along the rails 107 and 109 by the display screen cable 117 being folded behind the display screen within the display screen housing 105. When the display screen housing 105 is slid upward along the rails 107 and 109 the resulting tension on the display screen cable 117 then causes it to unfold and extend out through the bottom of the display screen housing 105 (see FIG. 7A).

If the display screen cable 117 is a ribbon-type display screen cable 117, it may twist while passing through the hinge rod housing 115 (see also FIG. 1C) such that the section of the cable between the notebook computer base unit 101 and the hinge rod housing 115 (although not limited to notebook computers) may be in a position to bend properly when display rails 107 and 109 pivot, but also be able to fold properly behind the display screen housing 105 when the display screen housing 105 is slid down along the rails 107 and 109. The twist of the ribbon-type display screen cable 117 while passing through the hinge rod housing 115 may be caused by the display screen ribbon-type cable 117 passing through an exit slit opening in the hinge rod housing 115 that is at a 90° angle compared to the entrance slit opening in the hinge rod housing 115.

Figure 8A:
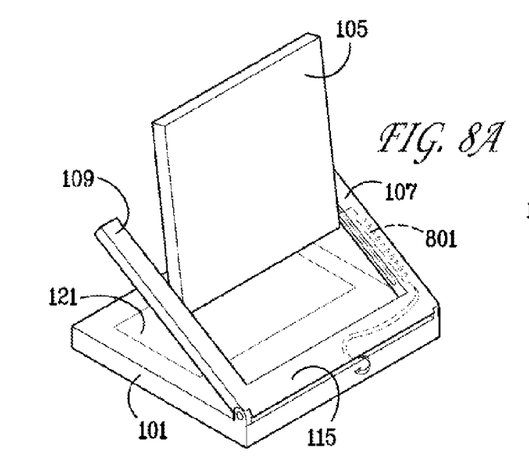
FIG. 8A is a rear perspective view of the notebook computer of FIG. 1B with the adjustable display screen open and showing a coiled display screen cable configuration.

Referring next to FIG. 8A shown is a rear perspective view of the notebook computer 100 of FIG. 1B with the adjustable display screen housing 105 slid up and showing a coiled display screen cable configuration according to some example embodiments. Depicted is a coiled display screen cable 801 disposed within the display screen rail 107 and hinge rod housing 115. The coiled display screen cable 801 may be coiled in a manner similar to that of a telephone handset cord such that it may expand and retract in a spring-like fashion when one end of the display screen cable 801 is pulled or released. Also, the coiled display screen cable 801 may be located in any one of the display screen rails 107 and 109.

Figure 8B:
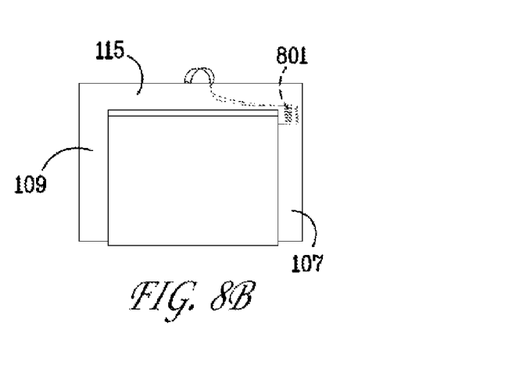
FIG. 8B is a top planar view of the notebook computer of FIG. 8A with the adjustable display screen closed and partially slid forward on two rails showing a coiled display screen cable within one of the rails.

Referring next to FIG. 8B, shown is a top planar view of the notebook computer of FIG. 8A with the adjustable display screen housing 105 folded down and partially slid forward on two rails 107 and 109 showing the coiled display screen cable 801 within one of the rails 107 according to some example embodiments. The coiled display screen cable may run from a back side wall of the notebook computer base unit 101 (see FIG. 8A) through an opening in a back side wall of the hinge rod housing 115 and through the interior of the display screen rail 115 (clearing any mechanisms within the display screen rail 115 and fixed hinge housing 115). The coiled display screen cable 801 may exit through the slot 119 on the interior wall of the display screen rail 107 to connect to the display screen through the side wall of the display screen housing 105.

As the display screen housing 105 slides forward and backward along the display screen rails 107 and 109, the coiled display screen cable 801 can expand and/or retract within the display screen rail 107. Portions of the coiled display screen cable 117 may also be affixed to an interior wall of the display screen rail 107 and/or to an interior wall of the hinge rod housing 115 in order to prevent slippage of the coiled display screen cable 801 or entanglement of the coiled splay screen cable 801 with other internal mechanisms of the display screen rail 107 or hinge rod housing 115.

An alternative display screen cable configuration may comprise one or more strips of electrically conductive material along the interior of one or more display screen rails 107 and 109 that are connected to a display screen cable leading to the notebook computer base unit 101. These one or more strips of electrically conductive material along the interior of one or more of the display screen rails 107 and 109 may be electrically coupled to the display screen 103 via contact with electrically conductive material on a connector of the display screen that may extend into one or more of the display screen rails 107 and/or 109 through the slot 119 in one or more of the display screen rails 107 and/or 109. This arrangement may facilitate continuous (or nearly continuous) electrical conductivity between the display screen and the base unit 101 as the display screen housing 105 slides along the display screen rails 107 and/or 109.

Figure 9:
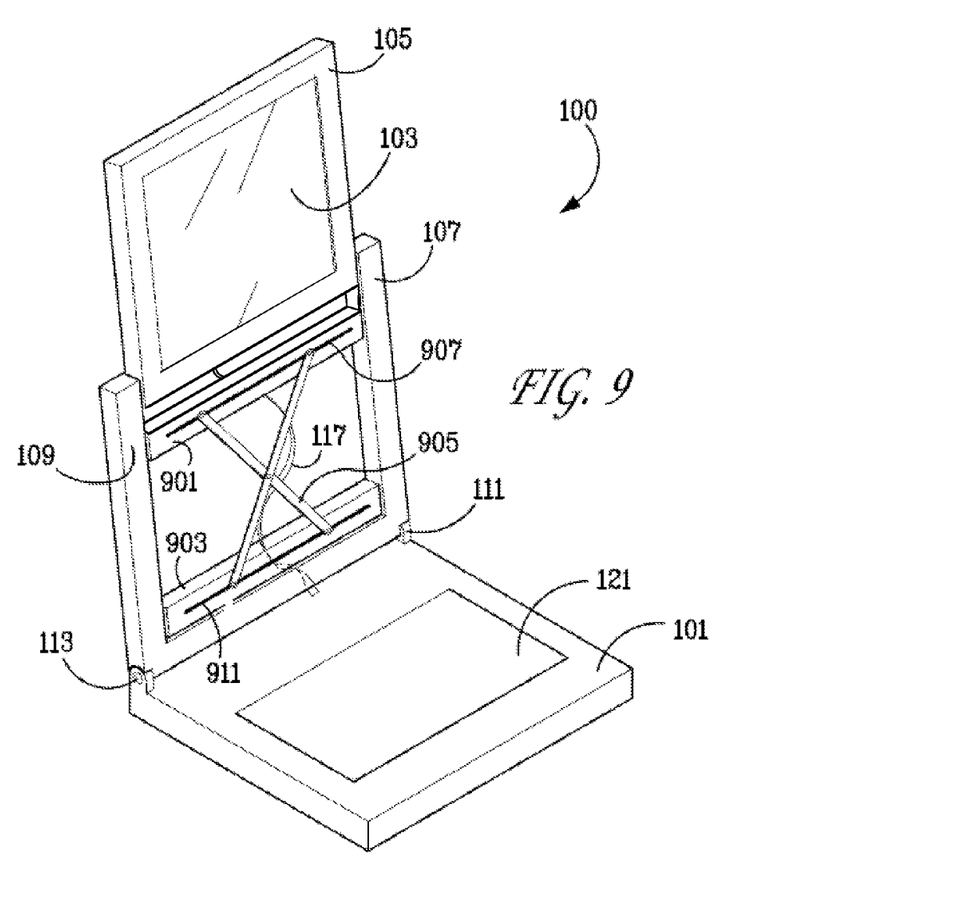
FIG. 9 is a front perspective view of a notebook computer with an adjustable display screen open and slid upward on two rails above a scissor joint stabilizing element.

Referring next to FIG. 9, shown is a front perspective view of a notebook computer 100 with an adjustable display screen 103 open and slid upward on two rails 107 and 109 above a scissor joint stabilizing element 905 according to some example embodiments. Depicted are the components of the computer notebook of FIG. 1B additionally with top and bottom scissor joint rails 901 and 903, and a set of crossed scissor joint arms 905. The top scissor joint rail 901 is disposed below the display screen housing 105 and positioned laterally between the display screen rails 107 and 109 and also positioned parallel to the bottom edge of the display screen housing 105. The top scissor joint rail 901 is slidably coupled to the display screen rails 107 and 109 at each end of the top scissor joint rail 901. The top scissor joint rail 901 is also fixedly coupled to the bottom edge of the display screen housing 105 such that the top scissor joint rail may slide along the display screen rails 107 109 along with the display screen housing 105. Also, there is sufficient space between the bottom of the display screen housing 105 and the top scissor joint rail 901 to allow for the pivoting of the display screen housing 105 on the display screen rails 107 and 109.

The bottom scissor joint rail 903 may be disposed below the top scissor joint rail 901 and positioned laterally between the display screen rails 107 109 parallel to the top scissor joint rail 901. The bottom scissor joint rail 903 may be fixedly coupled to the display screen rails 107 109 such that movement of the display screen housing does not also cause movement of the bottom scissor joint rail 903. Also, in some example embodiments, the display screen cord 117 may be adapted to travel through the bottom scissor joint rail from the notebook computer base unit 100 and behind the set of scissor joint arms 905 to couple to the display screen 103 behind the display screen housing 105. In some alternatives, a coiled display screen cable configuration may be used such as that shown in FIGS. 8A and 8B.

There is a scissor joint rail slot 907 horizontally aligned along the top scissor joint rail 901 and also a scissor joint rail slot 911 horizontally aligned along the bottom scissor joint rail 903. The ends of the set of scissor joint arms 905 are slidably coupled to the top and bottom scissor joint rail arms 901 and 903 at these scissor joint rail slots 907 and 911. Thus, the ends of the set of scissor joint rail arms 905 are adapted to slide horizontally along the scissor joint rail slots 907 and 911 as the display screen housing 105 slides along the display screen rails 107 and 109.

Figure 10A:
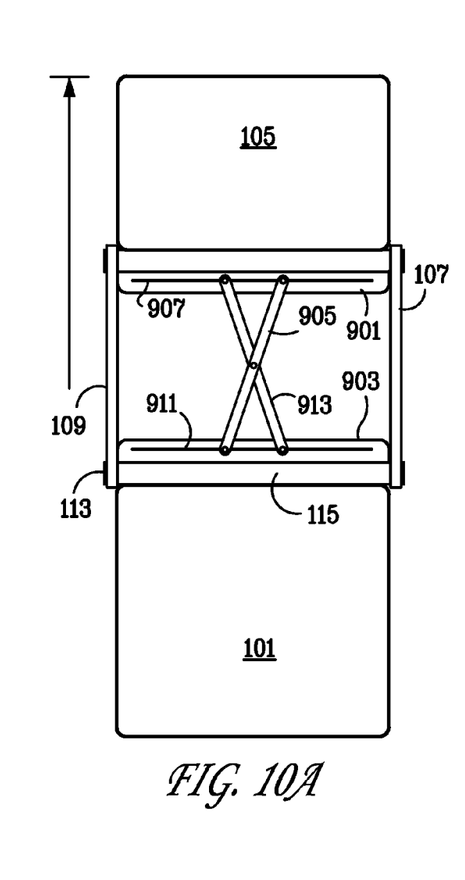
FIG. 10A is a top planar view of the notebook computer of FIG. 9 with the adjustable display screen open 180° and slid completely upward on the two rails showing the scissor joint completely open.
Figure 10B:
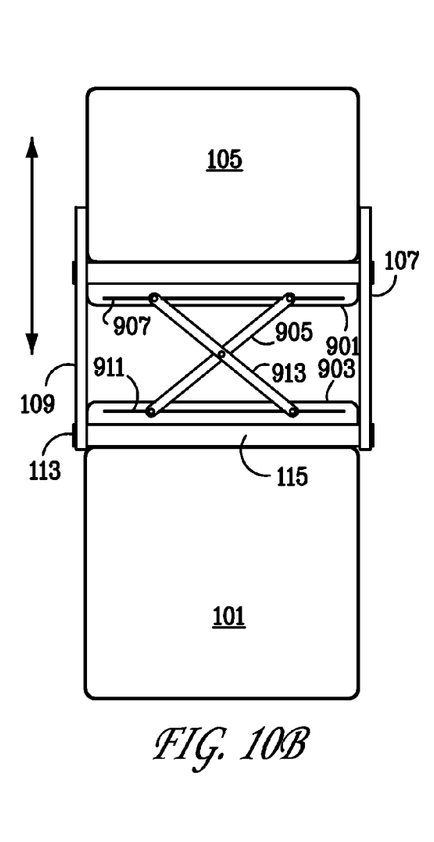
FIG. 10B is a top planar view of the notebook computer of FIG. 9 with the adjustable display screen open 180° and slid partially down on the two rails showing the scissor joint partially collapsed.
Figure 10C:
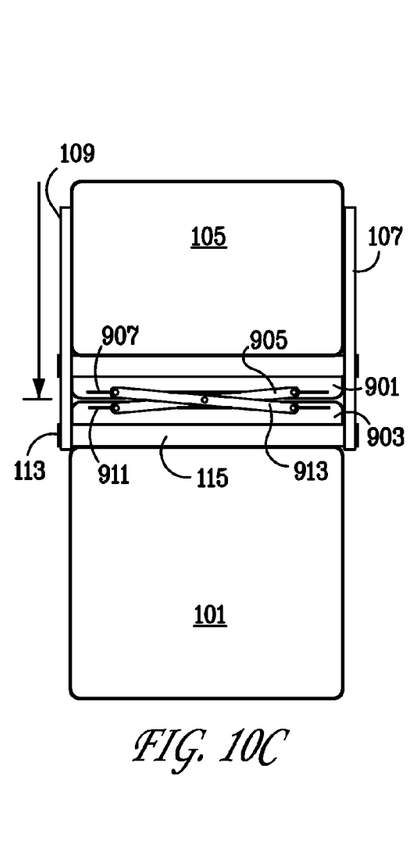
FIG. 10C is a top planar view of the notebook computer of FIG. 9 with the adjustable display screen open 180° and slid completely down on the two rails showing the scissor joint completely collapsed.

Referring next to FIGS. 10A, 10B and 10C, shown are three top planar views of a notebook computer similar to that of FIG. 9 with the adjustable display screen open 180° and slid completely upward, slid partially down, and slid completely down, respectively, on the two display screen rails 107 and 109. The top and bottom scissor joint rails 907 and 911 and the set of scissor joint arms 905 may provide additional stability and cross-support to the display screen rails 107 and 109 as the display screen housing 105 is slid along the display screen rails 107 and 109.

Note that the set of scissor joint arms 905 can comprise two crossed members that are rotatably attached at their crossing point and whose ends move horizontally along the top and bottom scissor joint rails 907 and 911, thereby causing the angle of the set of scissor joint arms 905 to increase or decrease with respect to the top and bottom scissor joint rails 907 and 911. An example scissor joint member 913 may be closer to being perpendicular to the top and bottom scissor joint rails 907 and 911 when the display screen housing 105 is slid completely upward on the display screen rails 107 and 109 (see FIG. 10A). In contrast, the example scissor joint member 913 may be closer to being parallel to the top and bottom scissor joint rails 907 and 911 when the display screen housing 105 is slid completely down on the display screen rails 107 and 109 (see FIG. 10C). The top and bottom scissor joint rails 907 and 911 and/or the set of scissor joint arms 905 may be made of a rigid material such as, for example, a polymer plastic or aluminum for extra rigidity.

Figure 11:
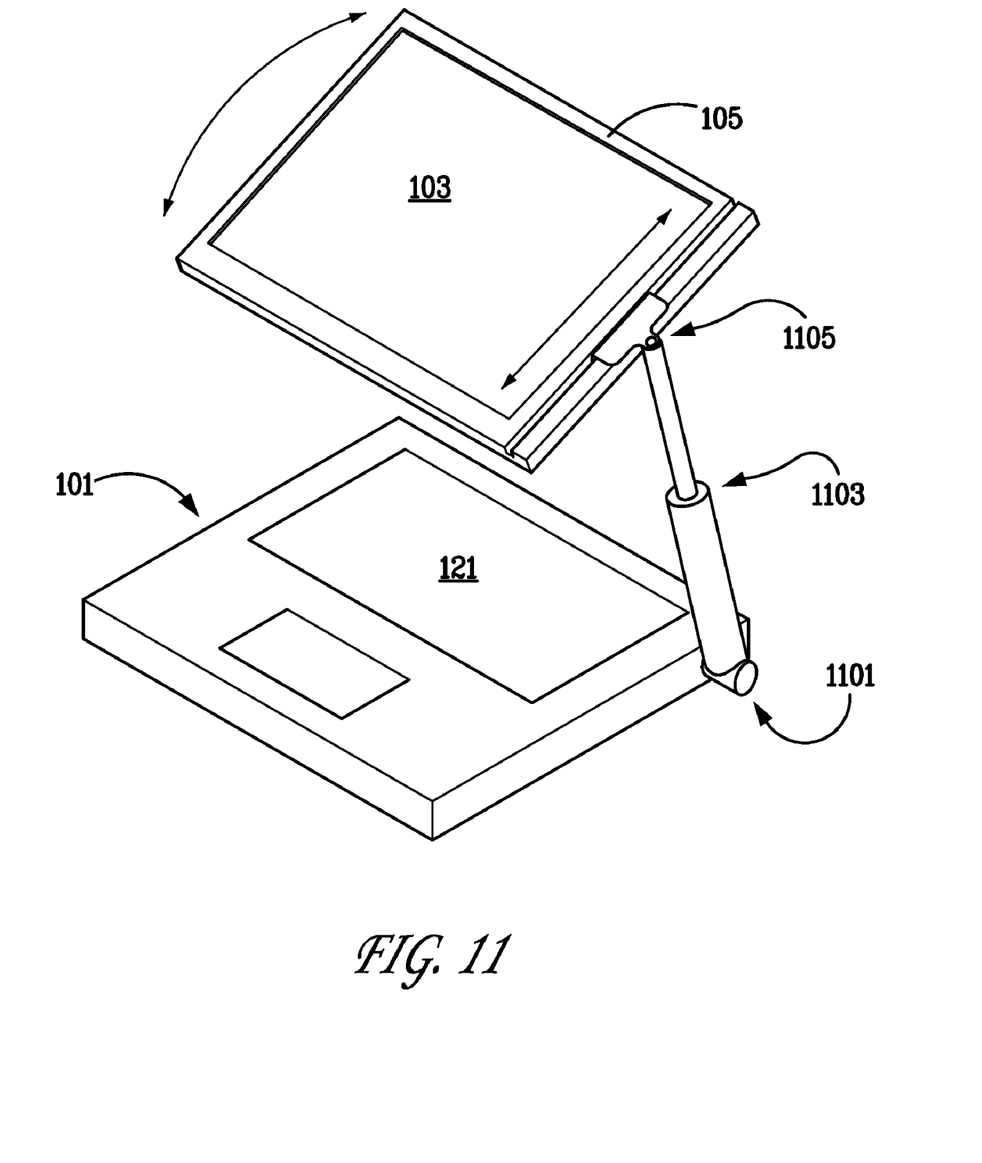
FIG. 11 is a front perspective view of a notebook computer with an adjustable display screen open and slid upward on one rail and pivoted to face a user.

Referring next to FIG. 11, shown is a front perspective view of a notebook computer with an adjustable display screen open and slid upward on one rail and pivoted to face a user. One end of the display screen rail 1103 is rotatably coupled to the notebook computer base unit 101 at a hinge 1101 at the back of the notebook computer 100. The display screen housing 105 may be slidably and/or rotatably coupled to a telescoping display screen rail 1103 or arm via at least one slot running along a side of the display screen housing 105 into which a carriage 1105 rotatably attached on one end of the display screen rail 1103 is slidably coupled. One may be able to manually open the notebook computer 100 and pull the display screen housing 105 upward and/or outward to cause the telescoping display screen rail 1103 to extend to adjust the display screen housing 105 height above the notebook computer base unit 101 and keyboard area 121. One may also manually pivot the rail 1103 and the display screen housing 105 back and forth independently to change the distance and angle of the display screen housing 105 relative to a user sitting in front of the notebook computer 100 and also to close the notebook computer by pivoting the display screen housing on the display screen housing rail 1103 to be facing and parallel to the base unit 101 and then lowering the display screen housing on the telescoping display screen rail 1103.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. An apparatus comprising:
a base unit having a back edge that includes a hinge rod;

a first display screen rail having a first end and a second end, wherein the first end of the first display screen rail is rotatably coupled to the back of the base unit at the hinge rod;
a second display screen rail having a first end and a second end, wherein the first end of the second display screen rail is rotatably coupled to the back of the base unit at the hinge rod;
a display screen housing;
slidable hinge pins that extend between interior sides of the first and second display screen rails and exterior sides of the display screen housing, wherein the slidable hinge pins are configured to slide up and down the first and second display screen rails;
wherein the display screen housing is moveably coupled between the first and second display screen rails with the slidable hinge pins, and wherein the display screen housing is thereby adapted to slide along and pivot between the first and second display screen rails; and
an internal coupling mechanism that is adapted to transmit motion of the display screen housing along the first display screen rail to motion of the display screen along the second display screen rail, wherein the internal coupling mechanism comprises:
a first gear coupled to a first end of the hinge rod;
a second gear coupled to a second end of the hinge rod;
a first belt that is adapted to mesh with the first gear, wherein the first belt is coupled to the display screen housing via a carriage coupled with a slidable hinge pin extending through a slot in the first display screen rail; and
a second belt that is adapted to mesh with the second gear, wherein the second belt is coupled to the display screen housing via a carriage coupled with a slidable hinge pin extending through a slot in the second display screen rail such that movement of the display screen housing along the first and second display screen rails causes the first and second belts to both rotate in unison with the hinge rod.

2. The apparatus of claim 1 wherein the first and second belts comprise toothed belts.

3. The apparatus of claim 2 wherein the first and second toothed belts are located at least partially within a respective one of the first and second display screen rails.

4. The apparatus of claim 1 wherein the display screen housing is adapted to slide along and pivot on the first and second display screen rails in a direction that facilitates user access to a user input device located on a top surface of the base unit.

5. The apparatus of claim 1 further comprising a display screen cable coupled between the display screen housing and the base unit through at least a portion of the hinge rod, wherein the display screen cable is substantially hidden behind the display screen housing when the display screen housing is moved to a substantially downward position relative to the base unit along the first and second display screen rails.

6. The apparatus of claim 5 wherein the display screen cable is adapted to unfold from behind the display screen housing when the display screen housing is moved to a substantially upward position relative to the base unit along the first and second display screen rails.

7. The apparatus of claim 6 wherein the display screen cable is a ribbon-type cable.

8. The apparatus of claim 1 further comprising a display screen coil cable coupled between the base unit and the display screen housing through a slot in either the first or second display screen rail, wherein the display screen coil cable is adapted to expand within said first or second display screen rail when the display screen housing is moved upward relative to the base unit along the first and second display screen rails, and wherein the display screen coil cable is adapted to contract within either the first or second display screen rail when the display screen housing is moved downward relative to the base unit along the first and second display screen rails.

9. The apparatus of claim 1 further comprising a scissor joint mechanism coupled between a bottom portion of the display screen housing and the back edge of the base unit, wherein the scissor joint mechanism is adapted to open or contract as the display screen housing is moved up or down, respectively, along the first and second display screen rails.

10. The apparatus of claim 9 wherein the scissor joint mechanism comprises:
a slidable first horizontal scissor joint rail coupled to the bottom of the display screen housing and slidably coupled to the first and second display screen rails at each end of the slidable first horizontal scissor joint rail;
a fixed second horizontal scissor joint rail positioned below the first horizontal scissor joint rail; and
a set of scissor joint arms having ends slidably coupled to the first and second scissor joint rails such that sliding of the display screen housing downward along the first and second display screen rails causes the set of scissor joint arms to collapse such that the distance between the slidable first horizontal scissor joint rail and fixed second horizontal scissor joint rail decreases when the set of scissor joint arms are in a substantially collapsed position.

11. The apparatus of claim 1 wherein the first and second display screen rails have dimensions such that when the apparatus is in a closed position, exterior sides of the first and second display screen rails are substantially even with side walls of the base unit, and front ends of the first and second display screen rails are substantially even with a front edge of the base unit.

12. The apparatus of claim 1 wherein the hinge rod is coupled to a hinge rod housing that is formed integral with the display screen rails.

13. An apparatus comprising:
a first display screen rail;
a second display screen rail;
a display screen housing disposed between the first and second display screen rails, the display screen housing being slidably and rotatably coupled to the first and second display screen rails with slidable hinge pins that extend between interior sides of the first and second display screen rails and exterior sides of the display screen housing;
an internal coupling mechanism adapted to transmit motion of the display screen housing along the first display screen rail to motion of the display screen housing along the second display screen rail, the internal coupling mechanism comprising:
a hinge rod;
a first gear coupled to an end of the hinge rod;
a second gear coupled to another end of the hinge rod;
a first belt adapted to mesh with the first gear, wherein the first belt is coupled to the display screen housing via a carriage coupled with a slidable hinge pin extending through a slot of the first display screen rail; and
a second belt adapted to mesh with the second gear, wherein the second belt is coupled to the display screen housing via a carriage coupled with a slidable hinge pin extending through a slot of the second display screen rail such that sliding movement of the display screen housing along the first and second display screen rails causes the first and second belts and the hinge rod to rotate substantially in unison.

14. The apparatus of claim 13, wherein the first and second belts comprise toothed belts.

15. The apparatus of claim 13 further comprising a scissor joint mechanism positioned below the display screen housing and adapted to open or contract when the position of display screen housing is slid up or down, respectively, along the first and second display screen rails.

16. An apparatus comprising:

an enclosed display screen rail housing having a slot opening into the enclosed display screen rail housing, the slot located along an interior wall of the enclosed display screen rail housing such that the slot is configured to face an edge of a display screen housing;

a toothed belt positioned within the enclosed display screen rail housing, the toothed belt running substantially the length of the enclosed display screen rail housing;

a first gear located within the display screen rail housing at a first end of the enclosed display screen rail housing and adapted to mesh with the toothed belt;

a hinge rod that extends out of the enclosed display screen rail housing, wherein the first gear is coaxially coupled to the hinge rod, and wherein the enclosed display screen rail housing is rotatable about the axis of the hinge rod and first gear;

a second gear located within the display screen rail housing at an opposite end of the enclosed display screen rail housing, wherein the second gear is adapted to mesh with the toothed belt so that the toothed belt, first gear, and second gear are adapted to rotate in unison;

a carriage coupled at a fixed location on the toothed belt such that when the toothed belt rotates, the carriage moves with the toothed belt up and down the inside of the enclosed display screen rail; and a hinge pin coupled to the carriage, the hinge pin extending through the slot for attachment to the edge of the display screen housing facing the enclosed display screen rail housing, wherein the hinge pin is arranged to allow the display screen housing to pivot with respect to the enclosed display screen rail housing, wherein the display screen rail housing, the toothed belt, the carriage and the hinge pin are arranged in cooperation with one another such that when the hinge rod rotates, the first and second gears and the toothed belt also rotate, causing the carriage and the hinge pin coupled thereto to move with the toothed belt up and down the inside of the enclosed display screen rail housing to effect sliding the hinge pin and display screen housing along the slot in the enclosed display screen rail housing while the display screen housing remains free to pivot about the hinge pin.

17. The apparatus of claim 16 further comprising a display screen coil cable coupled to the display screen housing through the slot in the display screen rail housing and adapted such that the coil expands within the display screen rail housing when the display screen housing is slid in one direction along the slot and contracts within the display screen rail housing when the display screen housing is slid in an opposite direction along the slot.

* * * * *